C. O. PARMENTER.
Sewing-Machine.
No. 8,767. Reissued June 24, 1879.
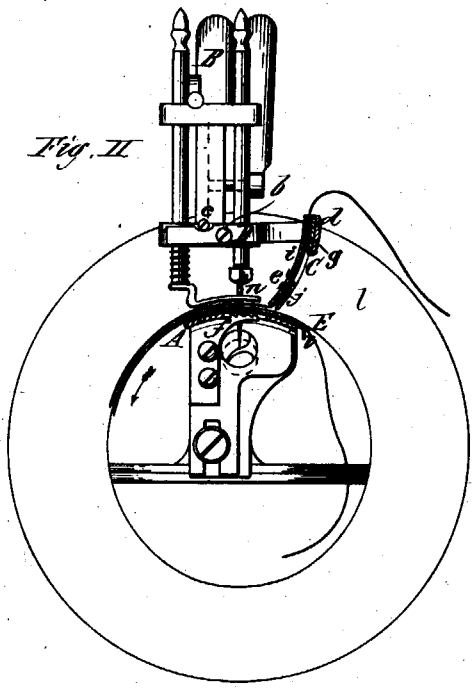
Fig. II
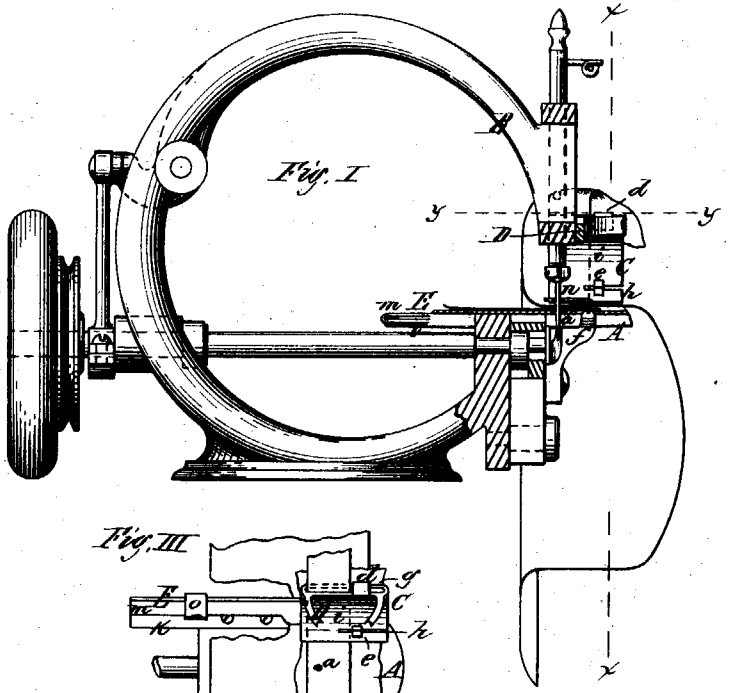
Fig. I
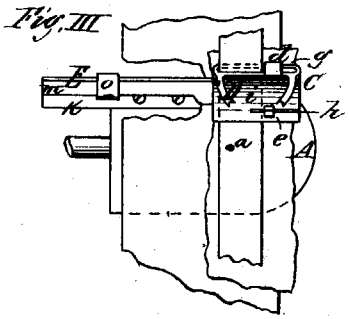
Fig. III
Witnesses— T. A. Curtis.
E. E. Curtis
Inventor.
Charles O. Parmenter
N. PETERS, PHOTO-LITHOGRAPHER, WASHINGTON, D. C.

UNITED STATES PATENT OFFICE.

CHARLES O. PARMENTER, OF AMHERST, MASSACHUSETTS.

IMPROVEMENT IN SEWING-MACHINES.

Specification forming part of Letters Patent No. 113,201, dated March 28, 1871; Reissue No. 8,767, dated June 24, 1879; application filed November 18, 1878.

*To all whom it may concern:*

Be it known that I, CHARLES O. PARMENTER, of Amherst, in the county of Hampshire and State of Massachusetts, have invented a new and useful Improvement in Sewing-Machines; and that the following is a full, clear, and exact description thereof, which will enable those skilled in the art to make and use the same, reference being had to the accompanying drawings, making a part of this specification, and to the letters of reference marked thereon.

This invention relates to a sewing-machine which is intended for sewing a band and a sweat to a hat both at the same time or separately.

To this end my invention consists, first, of a sewing or stitch-forming mechanism, combined with a guide to guide the sweat, and a plate adapted to support the hat and sweat while the latter is being sewed to the hat, whereby the needle will pass through the hat and sweat in a direction perpendicular to the surface of that portion in which each stitch is being formed; and it consists, second, of a sewing mechanism combined with a plate adapted to support a hat, a guide to guide the band into position to be sewed to the hat, and a guide to guide the sweat into position to be sewed in place; and it consists, third, of a stitch-forming mechanism, combined with a guide having a curved face-plate, and provided with two openings, one above and the other below, through which the band is passed while being sewed in place, so that the band is kept smooth and taut while being sewed in place, all which will be more fully hereinafter described.

Figure I represents a sectional side view of my invention. Fig. II is a transverse section of the same on a plane at line *xx* of Fig. I. Fig. III is a top view of a portion of a sewing-machine having my invention applied thereto, and adapted to be used in sewing sweats and bands to hats.

In the drawings, A is the supporting-plate or bed, which, by its position and shape, is adapted to support the hat, and which is provided with a throat, *a*, for the needle *n* of the sewing mechanism, which mechanism may be of either of the well-known constructions, and, as it forms no part in its details of my invention, requires no further description.

The arm B of the sewing-machine, which supports the needle and presser slides, is made in such form that the body of the hat can be placed upon the supporting-plate, and the brim made to extend up behind said arm, as shown in Fig. I, without throwing the hat out of shape.

The hat-band, which is to be attached to the body or crown of the hat near its junction with the brim, is fed down toward the needle *n* through a guide, C, which I make of a partially tubular form, and secure it to a lever, D, connected with the arm B by a pivot, *b*, on which the lever swings freely, so that the guide can be readily raised or allowed to drop. A stop, *c*, prevents the guide from dropping down too low, its lower end being retained at a slight elevation above the surface of the hat-body, so that it does not interfere with the feed-motion.

The feed *f* of the sewing mechanism acts upon that part of the hat (but upon the opposite side) against which the presser-foot of the machine operates, as in ordinary sewing, and this feed may be constructed according to any of the well-known plans employed by sewing-machine manufacturers; and as the hat is caused to turn by the feed in the direction indicated by the arrow in Fig. II, the hat-band is drawn in and attached to the hat by the action of the sewing mechanism.

The guide C may be provided with two gages, *d* and *e*, one above and the other below.

The upper gage, *d*, straddles a bar, *g*, Figs. II and III, to hold it in place, while the gage *e* is held by and moves in a slot, *h*, in the face-plate *i* of the guide, so that said gages can be readily adjusted to conform to the width of the hat-band to be passed through the guide.

The face-plate *i* is curved, as shown in Fig. II, and to it I attach two metallic bars, *g* and *j*, so as to produce guides through which the band may pass, one near each end of the face-plate. The band-guides may thus be constructed cheaply and expeditiously, and the band, being held up close to the face-plate by the friction caused by its movement around the bars and through the guides, is held taut and smooth, and is prevented from turning over or wrinkling.

The sweat, which is to be sewed to the hat at or near the junction of the crown with the brim, is conducted to the sewing mechanism through the guide E, connected with the supporting-plate; and this guide consists of a base-plate, K, provided with a flange, *l*, and also with a strap, *m*, having curved ends, forming a partially tubular guide for the sweat.

A gage, *o*, is fitted to the strap and flange, so that it may be conveniently moved either in or out, and easily adjusted to the width of the sweat.

In securing a sweat to a hat, the sweat is passed through its guide E and spread on the supporting-plate A, and, the hat being adjusted under the presser-foot and upon the plate, the machine is started and the sweat sewed to the hat.

In sewing a band to a hat, the band is passed through the guide C, the hat being adjusted beneath the presser-foot and upon the plate A, and the sewing is proceeded with as before; or both the sweat and the band may be attached to the hat at one and the same time, if desired. The hat and sweat being supported in this position by the plate, the needle, in forming the stitches, passes down through the hat and sweat in a direction perpendicular to the surface of that portion in which each stitch is being formed.

Having described my invention, what I claim as new is—

1. The combination, with an organized sewing or stitch-forming mechanism and a guide to guide the sweat, of a plate arranged and adapted to support a hat and sweat while the sweat is being sewed thereto, whereby the needle will pass through the hat and sweat in a direction perpendicular to the surface of that portion in which each stitch is being formed, substantially as described.

2. The combination, with an organized sewing mechanism, of a supporting-plate adapted to support a hat, a band-guide adapted to conduct the band to the hat while being sewed in place, and a sweat-guide adapted to conduct the sweat into position to be sewed to the hat while the latter is supported on said plate, substantially as described.

3. The combination, with an organized sewing or stitch-forming mechanism, of a guide having a curved face-plate, *i*, and provided with two openings, one above and the other below, through which to pass the band while being sewed to the hat, whereby the band is held smooth and taut while being sewed in place, substantially as described.

CHARLES O. PARMENTER.

Witnesses:

T. A. CURTIS,

E. E. CURTIS.